L. P. WELFLEY.
SCREW PLUG FOR GREASE CUPS.
APPLICATION FILED DEC. 24, 1912.
1,060,520.
Patented Apr. 29, 1913.
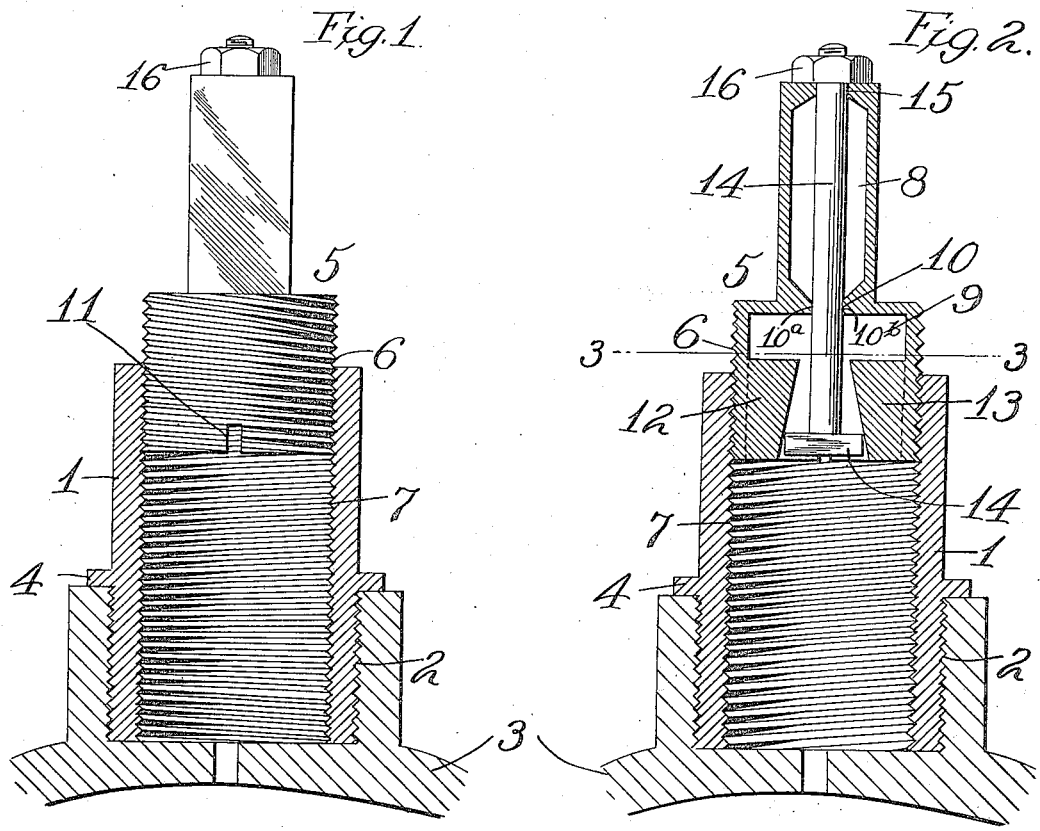
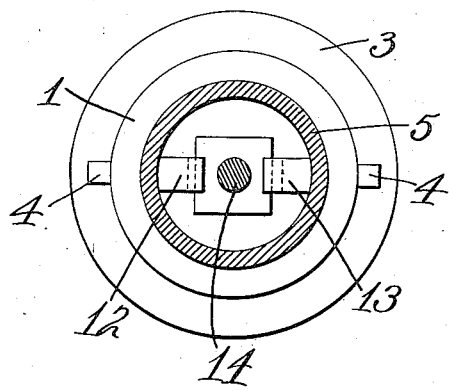
Attest:
Benton M. Stahl.
Chas. F. Calhoun, Jr.
Inventor.
L. P. Welfley.

UNITED STATES PATENT OFFICE.

LAWRENCE P. WELFLEY, OF HINTON, WEST VIRGINIA.

SCREW-PLUG FOR GREASE-CUPS.

1,060,520.　　　　　　Specification of Letters Patent.　　Patented Apr. 29, 1913.

Application filed December 24, 1912. Serial No. 738,485.

*To all whom it may concern:*

Be it known that I, LAWRENCE P. WELFLEY, a citizen of the United States, residing at Hinton, West Virginia, have invented certain new and useful Improvements in Screw-Plugs for Grease-Cups, of which the following is a specification.

The present invention has for its object to provide a novel form of screw plug to be used in connection with grease-cups, particularly the type in which a lubricant of a non-fluid character is applied to moving parts of a machine, as for example pitman rods or similar parts subject to vibration.

The object of the invention is to provide a screw plug of the type mentioned constructed in such manner as to be easily secured and maintained in position without danger of accidental displacement due to shock or vibration of the parts upon which it may be applied.

Further objects of the invention are to provide a plug of simple design, economical in cost of production, capable of withstanding severe wear and at the same time of lighter weight than those heretofore in use.

With these and other objects in view the invention consists in the construction and arrangement of parts more particularly set forth in the following specification and pointed out in the appended claim.

In order to more clearly understand the invention reference is to be had to the accompanying drawing in which similar parts are designated by reference numerals of like character and in which—

Figure 1 is a view illustrating the application of the invention, the screw plug shown in elevation, the grease cup and its support in section. Fig. 2 is a sectional view of the screw plug and grease-cup. Fig. 3 is a horizontal section on the line 3—3, Fig. 2.

The device comprises a grease cup 1, of cylindrical form, the lower portion of which is externally threaded, as at 2, to fit into the part 3 carrying the lubricator. Lugs 4 limit the inward movement of the cup. The lubricant, which may be hard oil or grease of any kind, is placed within the cup and forced therefrom by means of the plug 5, the lower portion of which is formed with external screw threads 6 to engage with similar internal threads 7 along the inner surface of the cup. The upper diminished portion of the plug 5 is of square or angular exterior to facilitate the use of a wrench or tool in screwing the plug to adjust its position within the cup.

In order that the plug might be as light in weight as possible it is hollowed out, forming two interior chambers 8 and 9 communicating with each other by a central passage 10. The plug is formed of two integral portions, the lower of said portions being of circular cross section, corresponding in diameter to the inner diameter of the cup, while the upper portion, as above mentioned, is square in section and of diminished size. The lower end of the plug is provided with vertical slots 11 extending upwardly, whereby provision is made for spreading or expanding the lower portion of the plug. Formed integral with the walls of the lower portion of the plug are two inwardly extending portions 12 and 13 diametrically opposite one another and having their inner edge beveled to form a central opening tapering upwardly from the bottom of the plug. An ordinary machine bolt 14 is passed upwardly through this opening so that its head contacts with the inclined surfaces 12 and 13 and its stem fits snugly into the passage 10, while its screw threaded end projects through a similarly formed opening 15 at the upper end of the plug. The bolt is held in position by a nut 16 threaded upon its upper end which bears against the top surface of the plug. This bolt therefore constitutes the spreader or expander and it will be readily seen that when the nut 16 is tightened up the head of the bolt will be drawn upwardly against the tapering sides 12 and 13, thus spreading the lower portion of the plug outwardly to firmly grip the internal threads of the cup. It is to be noted that when the lower portion of the plug expands, the portions of the upper part of the plug which form the passage 10 will be firmly wedged against the bolt at the points 10$^a$ and 10$^b$ in such manner as will prevent any escape of the lubricant above this point into the upper chamber 8. An additional advantage obtained by having the lower part of the plug hollowed to form the chamber 9 is that a larger space is provided for the storage of the lubricant, besides the reduction of weight attained thereby. By using an ordinary machine bolt as the expanding means, the expense of providing a specially machined member is avoided. At the same time by providing the comparatively narrow contact surface at 10ª and making the opening of a size to secure a drive fit when entering the bolt, I secure a perfectly tight joint, as the narrow metal edge will yield sufficiently under such driving action to fit or adapt itself to the bolt. Thereby I avoid the expense of providing a specially turned bolt or packing means.

Having described my invention, I claim:

In combination with a grease cup internally threaded, a hollow screw plug comprising an upper and lower portion formed integrally, said portions being cored out to form an upper and lower chamber communicating with each other through a centrally disposed annular passage, the walls of the lower portion of said plug having vertical slots and provided with two inwardly extending portions beveled on their inner faces to form a centrally disposed inwardly tapering opening in the lower end of the plug, an expanding bolt having a square head adapted to be inserted with its head fitting against the sides of the tapered opening and its stem extending upwardly through said upper chamber having a drive fit through said annular passage between the two chambers and means carried on the opposite end of said bolt for forcing its head inwardly into said tapering opening thereby expanding the lower portion of the plug, the upper portion of said plug being formed of square or annular exterior to receive a tool for turning same, substantially as described.

In testimony whereof, I affix my signature in presence of two witnesses.

LAWRENCE P. WELFLEY.

Witnesses:
 L. M. MEADAR,
 A. A. BOWDLE.